United States Patent
Saghir et al.

(10) Patent No.: US 12,557,059 B2
(45) Date of Patent: Feb. 17, 2026

(54) SYSTEM AND METHOD FOR CONTROLLING CLOSED SUBSCRIBER GROUP ACCESS TO NETWORKS

(71) Applicant: Verizon Patent and Licensing Inc., Basking Ridge, NJ (US)

(72) Inventors: Amir Saghir, Frisco, TX (US); Said Hanbaly, Prosper, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

(21) Appl. No.: 17/843,422

(22) Filed: Jun. 17, 2022

(65) Prior Publication Data

US 2023/0413211 A1   Dec. 21, 2023

(51) Int. Cl.
| | |
|---|---|
| H04W 60/04 | (2009.01) |
| H04W 8/18 | (2009.01) |
| H04W 76/10 | (2018.01) |
| H04W 84/04 | (2009.01) |

(52) U.S. Cl.
CPC ........... *H04W 60/04* (2013.01); *H04W 8/186* (2013.01); *H04W 76/10* (2018.02); *H04W 84/042* (2013.01)

(58) Field of Classification Search
CPC ... H04W 60/04; H04W 76/10; H04W 84/042; H04W 84/045; H04W 8/186
See application file for complete search history.

(56) References Cited

U.S. PATENT DOCUMENTS

| | | | | |
|---|---|---|---|---|
| 2009/0305699 | A1* | 12/2009 | Deshpande | H04W 48/16 455/434 |
| 2010/0130215 | A1* | 5/2010 | Jung | H04W 48/02 455/450 |
| 2012/0157095 | A1* | 6/2012 | Fodor | H04W 4/08 455/434 |
| 2013/0122901 | A1* | 5/2013 | Chen | H04W 48/06 455/434 |
| 2013/0208644 | A1* | 8/2013 | Jung | H04W 4/08 370/312 |
| 2013/0273890 | A1* | 10/2013 | Du | H04W 12/08 455/411 |
| 2017/0055194 | A1* | 2/2017 | Cho | H04W 48/02 |
| 2019/0021051 | A1* | 1/2019 | Joseph | H04W 48/20 |
| 2019/0110244 | A1* | 4/2019 | Shih | H04W 76/27 |
| 2019/0191470 | A1* | 6/2019 | Joseph | H04W 48/02 |
| 2020/0236612 | A1* | 7/2020 | Hong | H04W 48/18 |

OTHER PUBLICATIONS

TS32.593 (Year: 2022).*

* cited by examiner

*Primary Examiner* — Kevin C. Harper
*Assistant Examiner* — Guoxing Fan

(57) ABSTRACT

A femtocell may include a processor. The processor may be configured to: receive Public Land Mobile Network (PLMN) identifiers (IDs) that identify PLMNs; receive, for each of the first PLMN IDs, a unique Closed Subscriber Group (CSG) ID; and broadcast the PLMN IDs and, for each of the PLMN IDs, the unique CSG ID.

20 Claims, 9 Drawing Sheets

```
SIB1 ::=     SEQUENCE {
    cellAccessRelatedInfo :: = SEQUENCE {
        plmn-IdentityList        PLMN-IdentittyList
502 →   csg-Info-per-plmn-list   SEQUENCE of CSG-Info-per-PLMN,
        trackingAreaCode         TrackingAreaCode,
        cellIdentity             CellIdentity,
        cellBarred               ENUMERATED  {barred, notBarred},
        intraFrequencySelection  ENUMERATED  {allowed, notAllowed},
        csg-Indication           BOOLEAN,
        csg-Identity             CSG-Identity
```

```
504 → CSG-Info-per-PLMN ::= SEQUENCE {
          plmn-Identity       PLMN-Identity
          csg-Info-List       SEQUENCE of CSG-Info
      }
506 → CSG-Info ::= SEQUENCE {
          csg-Identity        CSG-Identity,
          csgMode             ENUMERATED {open, closed, hybrid }
      }        ...
                    }
```

```
SIB1 ::=    SEQUENCE {
    cellAccessRelatedInfo :: = SEQUENCE {
        plmn-IdentityList         PLMN-IdentittyList
        trackingAreaCode          TrackingAreaCode,
        cellIdentity              CellIdentity,
        cellBarred                ENUMERATED {barred, notBarred},
        intraFrequencySelection   ENUMERATED {allowed, notAllowed},
        csg-Indication            BOOLEAN,
        csg-Identity              CSG-Identity,
512 →   plmns-per-csg-list        SEQUENCE of PLMNs-per-CSG
    }
...
```

```
514 → PLMNs-per-CSG ::= SEQUENCE {
          csg-Info          CSG-Info,
          plmn-IdentityList SEQUENCE of PLMN-Identity
      }
516 → CSG-Info ::= SEQUENCE {
          csg-Identity      CSG-Identity,
          csgMode           ENUMERATED {open, closed, hybrid }
      }     ...
                                }
```

```
SIB1 ::=      SEQUENCE {
   cellAccessRelatedInfo :: = SEQUENCE {
522 → plmn-IdentityList            SEQUENCE of PLMN-IdentittyInfo
      trackingAreaCode             TrackingAreaCode,
      cellIdentity                 CellIdentity,
      cellBarred                   ENUMERATED {barred, notBarred},
      intraFrequencySelection      ENUMERATED {allowed, notAllowed},
      csg-Indication               BOOLEAN,
      csg-Identity                 CSG-Identity
```

```
524 → PLMN-IdentityInfo ::= SEQUENCE {
      plmn-IdentityList   SEQUENCE (SIZE (1..maxPLMN)) OF PLMN-Identity,
      trackingAreaCode               TrackingAreaCode OPTIONAL,
      ranac RAN-AreaCode             OPTIONAL,
      cellIdentity                   CellIdentity,
526 → csg-Info-List                  SEQUENCE OF CSG-Info
      ...
}
```

```
528 → CSG-Info ::= SEQUENCE {
      csg-Identity        CSG-Identity,
      csgMode             ENUMERATED {open, closed, hybrid }
}
```

SYSTEM AND METHOD FOR CONTROLLING CLOSED SUBSCRIBER GROUP ACCESS TO NETWORKS

BACKGROUND INFORMATION

Some of today's cellular networks permit access to their networks through femtocells. A femtocell is a type of small base station, otherwise known as a small cell. Small cells include microcells, picocells, and femtocells. A microcell has a range of about two kilometers; a picocell has a range of about 200 meters; and a femtocell has a range of about 10 meters.

In contrast to microcells or picocells, femtocells can be installed on customer premises. A femtocell may connect to a service provider network through broadband connection and allow the service provider network to offer its services in areas where signals from cell towers may not reach. In addition, a femtocell may support Closed Subscriber Group (CSG) features. By using the CSG features, a femtocell may limit mobile devices, which connect to a network through the femtocell, from using femtocell resources.

BRIEF DESCRIPTION OF THE DRAWINGS

FIGS. 5A-5C show exemplary formats of CSG information in a System Information Block Type 1 (SIB1) according to different implementations;

DETAILED DESCRIPTION OF EMBODIMENTS

Figure 1A:
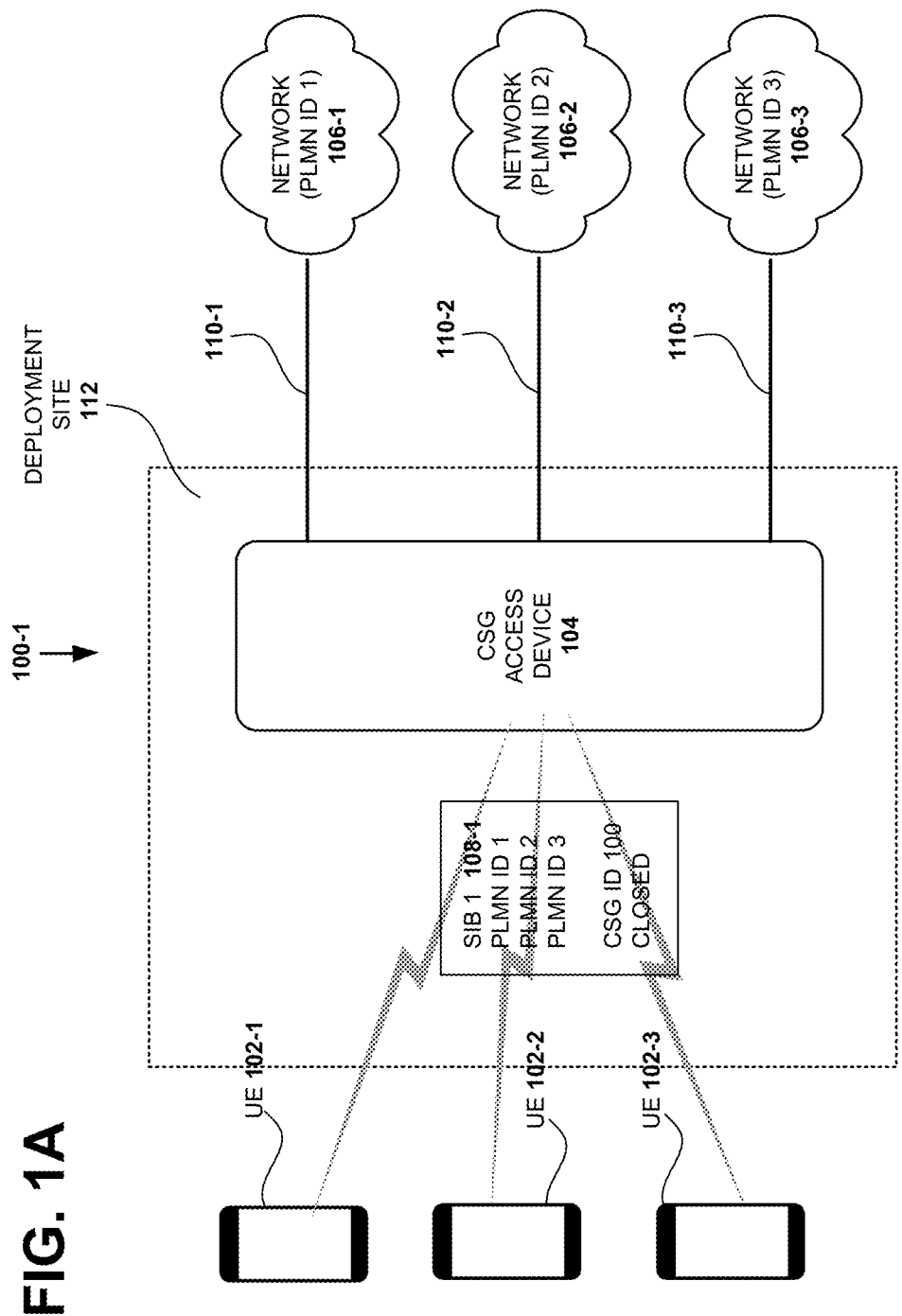
FIGS. 1A and 1B illustrate concepts described herein.

The following detailed description refers to the accompanying drawings. The same reference numbers in different drawings may identify the same or similar elements.

Systems and methods described herein relate to controlling Closed Subscriber Group access to networks. In particular, the systems and methods relate to fine-grained control of Closed Subscriber Group access to networks. A base station is a device that provides mobile devices (e.g., smart phones) wireless access to cellular networks. For example, a user equipment device (UE) may establish a wireless link with a base station that may be part of a Radio Access Network (RAN). The base station may have a communication link, such as a backhaul, to the core part of the cellular network.

A CSG-enabled base station (also referred to as a CSG access device or sometimes simply as a base station) is a base station that has the ability to limit UE access to the base station resources based on Closed Subscriber Groups (CSGs) to which the UEs belongs. Examples of CSG access devices include small cells, such as femtocells. That is, CSG access devices may control UE access to the base stations based on CSGs to which the UEs belong.

For example, when in operation, a CSG access device may transmit a CSG-related parameters, referred to as a CSG information. CSG information may include a CSG identifier (ID) and a CSG mode. When a UE detects the CSG information in the broadcast signal, the UE may determine, based on the CSG information, whether to connect to a cellular network associated with the base station. In addition, the UE may determine its behavior with respect to the base station based on the detected CSG information. When a UE requests an attachment to a CSG access device, the CSG access device may relay the request to the core of the cellular network. The core network may verify that the UE is a member of a CSG by looking up the subscription information (e.g., compare the CSG ID in the request to a CSG ID in the subscription information), to permit the UE to attach to the base station. Based on the information from the core network, the CSG access device may permit the UE to attach or to access its resources.

A CSG mode may include Open, Closed, and Hybrid. If a CSG, whose ID and mode are specified in a System Information Block type 1 (SIB1) transmitted by the base station, is in Open mode, the base station may avail its resources to any UE attaching to the base station and accessing networks through the base station. If a CSG is in Closed mode, the base station may provide its resources only to high-priority UEs (also referred to as "preferred UEs")—UEs that belong to the CSG. If the CSG is in Hybrid mode, the base station may provide its resources to any UE attached to the base station, with the proviso that, if there is a contention, between a preferred UE (e.g., a UE that belongs to the CSG) and a non-preferred UE, for base station resources, the preferred UE may preempt the non-preferred UE. That is, the base station may permit the preferred UE to access the resources and prevent the non-preferred UE from accessing the resources.

According to current standards, a CSG access device may permit a UE that attaches to the CSG access device to connect to a type of cellular networks, herein referred to as Public Land Mobile Networks (PLMNs). Despite the term "Public" Land Mobile Networks, each of the PLMNs may be either a private network or a public network and may be identified by a PLMN ID. For example, assume that a CSG access device has links/paths to three PLMNs: a first PLMN with a PLMN ID 1, a second PLMN with a PLMN ID 2, and a third PLMN with a PLMN ID 3. When a UE attaches to the CSG access device, the UE may connect, through the base station, to one of the three PLMNs.

According to an implementation, a CSG access device may permit an attaching UE to access one of many PLMNs but issue only a single CSG ID and a CSG mode. In this implementation, however, when the CSG access device, which restricts a UE connecting to a PLMN in accordance with the CSG mode, must also restrict UEs that connect to other PLMNs based on the CSG ID. This may be unduly limiting. In contrast, in other implementations, the systems and methods described herein permit a CSG access device to issue one or more CSG IDs and/or apply different CSG modes to UEs that connect, through the base station, to different PLMNs.

Figure 1B:
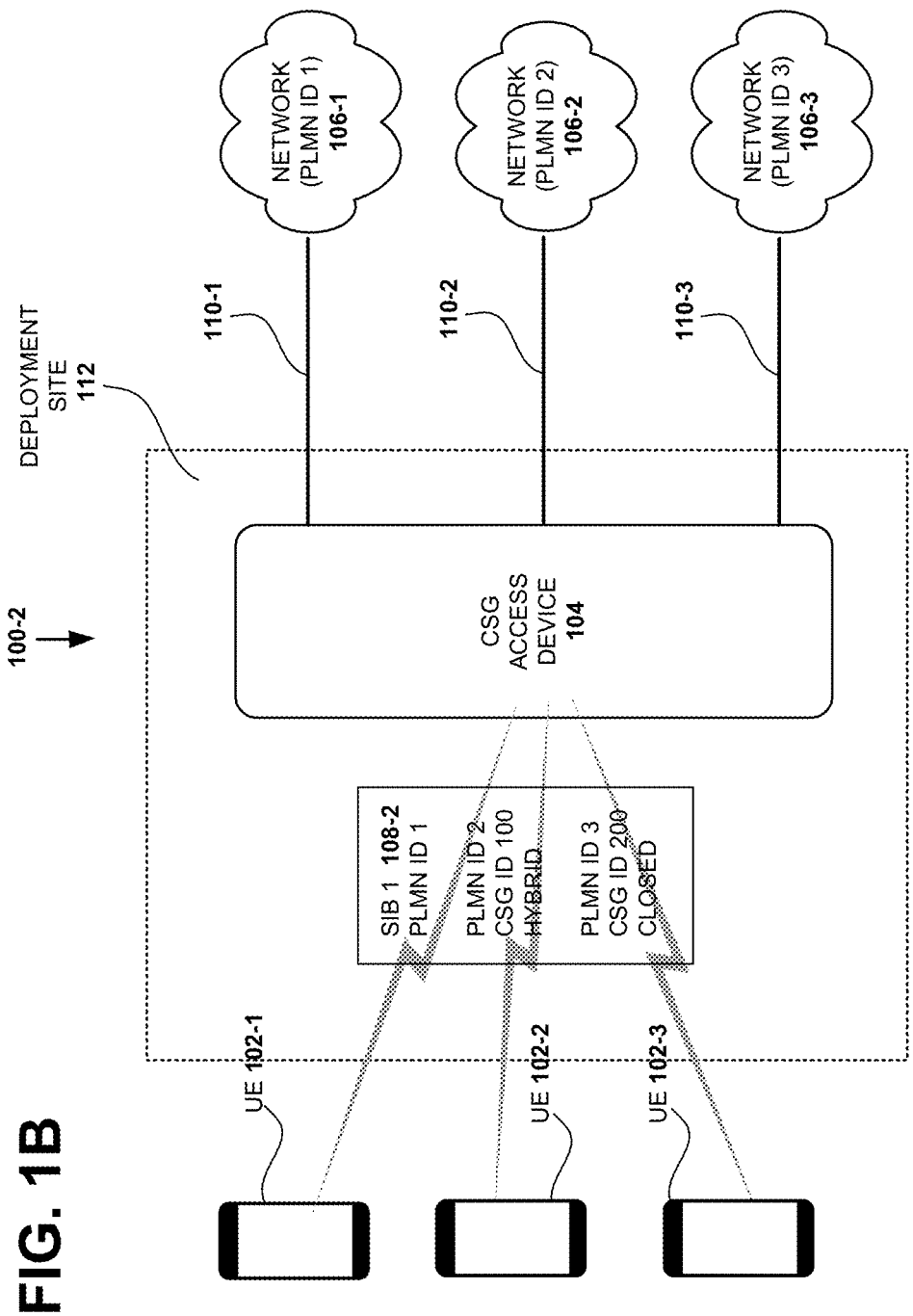

FIGS. 1A and 1B illustrate the concepts described herein. FIG. 1A shows an example setup 100-1 in which a CSG access device 104 issues a single CSG ID and a single CSG mode corresponding to the CSG ID. CSG access device 104 according to setup 100-1 may not be able to exert fine-grained control over UEs (e.g., UEs 102-1, 102-2, and 103-3) that access different PLMNs—illustrated as networks 106-1, 106-2 and 106-3. UE 102 (a generic UE or one of UEs 102-1, 102-2, and 102-3) may access one of the networks 106 via CSG access device 104 and one of communication paths 110-1, 110-2, and 110-3. UEs 102 and/or CSG access device 104 may be located within a deployment site 112 (e.g., a customer premises).

According to setup 100-1, there are at least two use-cases in which CSG access device 104 issuing a single CSG ID and a single mode may be unable to provide fine-grained control over UE device access to networks 106.

In the first use-case, assume that CSG access device 104 broadcasts a signal, herein referred to as System Information Block (SIB) of type 1 (SIB1) 108-1, that indicates a list of PLMN IDs, a CSG ID and a CSG mode. As shown, SIB1 108-1 lists the PLMN IDs as PLMN ID 1, PLMN ID 2, PLMN ID 3 and the CSG ID as CSG ID 100. The CSG mode is shown as closed. Assume that UE 102-1 is subscribed to network 106-1, which has the PLMN ID 1, and that UE 102-2 is subscribed to network 106-2, which has the PLMN ID 2. Also, assume that UE 102-1 does not belong to a CSG and thus would like to connect to network 106-1 under the open mode and that UE 102-2 belongs to a CSG with CSG ID 100. In this use case, CSG access device 104 cannot be configured to allow UE 102-1 to attach to the base station under the CSG open mode and to allow UE 102-2 to attach to the base station under the CSG closed mode since the CSG mode specified in SIB1 108-1 (i.e., closed) is common for all networks 106-1, 106-2, and 106-3. Furthermore, UEs 102-1 and 102-2 cannot be reconfigured to access network 106-1 unless UEs 102-1 and 102-2 are both members of the CSG with the CSG ID 100. UEs 102-1 and 102-2 may both be permitted to access network 106-2 if the CSG mode is open—UEs 102-1 and 102-2 cannot be differentiated based on CSG ID 100.

In the second use-case, assume that UE 102-1 is subscribed to network 106-1, UE 102-2 is subscribed to both networks 106-1 and 106-2, and UE 106-3 is subscribed to network 106-3. In this use-case, CSG access device 104 cannot be configured to permit UE 102-2 (which may connect to either network 106-2 or network 106-3) to attach to the base station under the CSG hybrid mode and UE 102-3 (which is to connect to network 106-3) to attach under the closed mode. The closed CSG mode is common to all PLMNs (networks 106).

FIG. 1B shows an example setup 100-2 in which a CSG access device 104 may exert fine-grained control over UEs 102 accessing networks 106 based on CSGs. According to this embodiment, CSG access device 104 may issue an SIB1 108-2 that is different from SIB1 108-1 in setup 100-1. In contrast to SIB1 108-1, SIB1 108-2 identifies, for PLMN ID 1 and PLMN ID 2, non-open mode CSGs for the corresponding network 106. For example, for PLMN ID 2, SIB1 108-2 lists CSG ID 100 and the hybrid mode for the CSG ID 100; for PLMN ID 3, SIB1 108-2 lists CSG 1D 200 and the closed mode; and for PLMN ID 1, SIB1 108-2 does not list a CSG ID and the corresponding mode. In this case, PLMN ID 1 is associated with a CSG in the open mode.

Assume that UE 102-1 is subscribed to network 106-1 but does not belong to a CSG; UE 102-2 is subscribed to both networks 106-1 and 106-2 and belongs to a CSG with CSG ID 100; UE 102-3 is subscribed to network 106-3 and belongs to a CSG with CSG ID 200. Under this setup, UE 102-1 may attach to CSG access device 104 to connect to network 106-1 under the open mode for a CSG (whose CSG ID is not shown); UE 102-2 may attach to CSG access device 104 to connect to network 106-1 (under the open mode) or connect to network 106-2 as a member of CSG 100 under the hybrid mode; and UE 102-3 may attach to CSG access device 104 to connect to network 106-3 as a member of CSG 200 under the closed mode.

In setup 100-2, CSG access device 104 may broadcast, in a SIB1 108-2, CSG IDs and the CSG modes for each PLMN ID, corresponding to a network to which CSG access device 104 may provide UEs 102 with connectivity. Although not shown, CSG access device 104 may issue multiple CSG IDs and the corresponding modes for each network identified by a PLMN ID. CSG access device 104 may provide the information in a particular format, as explained below with reference to FIGS. 5A-5C. When a UE 102 receives the CSG information and PLMN IDs as part of SIB1 108-2, the UE 102 may use the information and the PLMN IDs to connect to a subscribed PLMN under a CSG mode.

Figure 2:
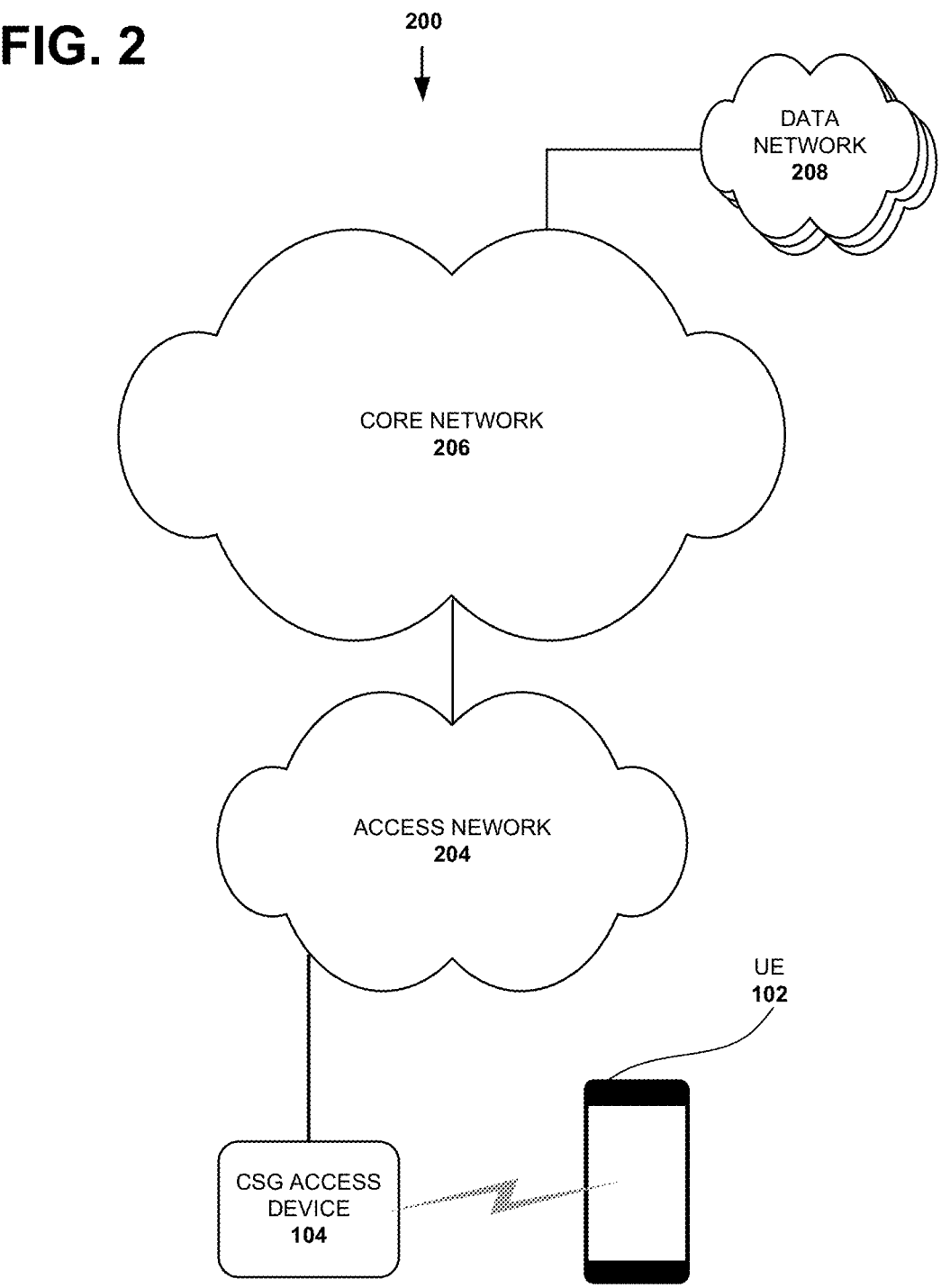
FIG. 2 illustrates an exemplary network environment in which systems and methods described herein may be implemented.

FIG. 2 illustrates an exemplary network environment 200 in which the system and methods described herein may be implemented. As shown, environment 200 may include a UE 102, CSG access device 104, an access network 204, a core network 206, and a data network 208. In some implementations, access network 204 and core network 206 may be part of a network that provides telecommunication services (e.g., network 106-1); and CSG access device 104 may be part of a network located within a customer premises. As used herein, the term "service provider" may refer to an entity that owns and/or operates such a network (e.g., network 106-1, access network 204, core network 206, data network 208, etc.). The term "customer premises" may be defined as an area which a customer of the network service provider occupies.

UE 102, CSG access device 104, access network 204, core network 206, data network 208, and/or another network device may include components of the systems for providing fine-grained control of CSG access to networks. The systems may operate under setup 100-1 and/or setup 100-2, depending on the implementation and the configuration.

UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

UE 102 may include PLMN IDs (for PLMNs that UE 102 may access and/or to which UE 102 is subscribed). For each PLMN ID, UE 102 may also include one or more CSG IDs, for the CSGs to which UE 102 belongs. For some PLMNs that UE 102 may access, UE 102 may not belong to a CSG and thus may not include a CSG ID for the PLMN. In such cases, UE 102 may attach to CSG access device 104 and connect to the PLMN, provided that the CSG for the PLMN is in the open mode.

To attach to CSG access device 104, UE 102 may process broadcast signals from CSG access device 104. The broadcast signals may include a SIB1, from which UE 102 may obtain PLMN IDs, CSG IDs, and/or CSG modes corresponding to the CSG IDs. Because UE 102 stores its own CSG IDs for each of the PLMNs to which it is subscribed, UE 102 may use the broadcast CSG information and the CSG information from its storage/memory, in determining whether to connect to the particular PLMN or to attach to CSG access device 104. When UE 102 attempts to attach to CSG access device 104 and connect to a PLMN, UE 102 may send a request to the CSG access device 104. The request may include a CSG ID for a CSG for the PLMN, unless the request is to attach to CSG access device 104 to connect to a PLMN under an open mode. In the latter case, the request may not include or specify a CSG ID.

As discussed above, CSG access device 104 may include a base station or a small cell, such as a femtocell. CSG access device 104 may be connected to access network 204 through a broadband or another type of connection (e.g., a backhaul). In some implementations, CSG access device 104 may be connected to different PLMNs through various networks, such as the Internet.

According to one implementation, CSG access device 104 may obtain, from a network component, a network administrator, or a user (e.g., a customer who may have purchased or leased the CSG access device 104 for local use), a list of PLMNs (or PLMN IDs). For each of the PLMNs identified by the PLMN IDs, CSG access device 104 may be able to provide UE 102 that attaches to CSG access device 104 with a communication link to/from the PLMN to UEs 102. In addition, for each of the PLMN IDs, CSG access device 104 may obtain, from a network component, a network administrator or a user, a list of CSG IDs, for each CSG that may access the PLMN under a CSG mode specified for the CSG ID. CSG access device 104 may organize the PLMN IDs, the CSG IDs, and the CSG modes and store the organized information in a local database. When in operation, CSG access device 104 may broadcast the information in a SIB1. When CSG access device 104 receives a request for attachment from a UE 102, CSG access device 104 may permit the UE 102 to access its resources depending on the CSG ID and the PLMN ID specified in the request.

For example, when CSG access device 104 receives a request to attach, CSG access device 104 may contact the network corresponding to the PLMN ID and relay some of the information (e.g., CSG ID) included in the request to core components of the network. The core network may retrieve the subscription information for the UE 102 to determine whether the UE 102 belongs to the CSG identified by the request (e.g., compare the CSG ID in the subscription information to the CSG ID in the request). Depending on the response from the core components, CSG access device 104 may permit or deny UE 102 from using its resources, attach to CSG access device 104 and/or to connect to the network.

If the request does not include a CSG ID, CSG access device 104 interprets the request as a request for an open mode for the CSG for the PLMN specified by the PLMN ID specified by the request. Depending on whether the mode of the CSG for the PLMN, CSG access device 104 may deny or permit UE 102 to access the PLMN.

Access network 204 may allow UE 102, through CSG access device 104, to connect to core network 206, data network 208, and other devices associated with or included in network 106-1 (e.g., another UE 102). To do so, access network 204 may establish and maintain, with participation from UE 102 and CSG access device 104, an over-the-air, wired, and/or optical channel with UE 102 and maintain backhaul channels with core network 206. Access network 204 may convey information through these channels, from UE 102 to core network 206 and vice versa, over CSG access device 104.

Access network 204 may include a Long-Term Evolution (LTE) radio network, a Fifth Generation (5G) radio network, another type of advanced radio network, a Local Area Network (LAN), a wide area network (WAN), or any type of network through which UE 102 can access core network 206 or data network 208. The radio networks of access network 204 may operate in many different frequency ranges, including millimeter wave (mmWave) frequencies, sub 6 GHz frequencies, and/or other frequencies. Access network 204 may include many access stations or access devices.

An access device may include a Fourth Generation (4G), 5G, or another type of access device (e.g., a wireless station, a base station, an evolved Node B (eNB), a next generation Node B (gNB), a Central Unit (CU), a Distributed Unit (DU), a Radio Units (RU), a gateway, etc.). Some access devices may include Radio Frequency (RF) transceivers for wireless or cellular communication. Other access devices may include gateway devices that serve as access points to network 106-1, core network 106, etc. In some implementations, an access device may include Integrated Access and Backhaul (IAB) nodes (not shown). Access devices may establish and maintain one or more channels with CSG access device 104 and backhaul channels with core network 206. The channels may be established a wired, over-the-air, or an optical link.

In some implementations, CSG access device 104 may be categorized or considered as a type of access device, with 4G, 5G, or another type of Radio Access Technology (RAT) communication capability. Although CSG access device 104 is shown in FIG. 2 as separate from access network 204, in some implementations, CSG access device 104 may be part of access network 204, rather than part of a network local to deployment site 112 or a customer premises.

Core network 206 may include 4G core network components, 5G core network components, or another type of core network components. Examples of 4G core network components include a Serving Gateway (SGW), a Packet data network Gateway (PGW), and a Mobility Management Entity (MME). Examples of 5G core network components include a User Plane Function (UPF), an Application Function (AF), an Access and Mobility Function (AMF), a Session Management Function (SMF), a Unified Data Management (UDM) function, a Network Slice Selection Function (NSSF), and a Policy Control Function (PCF). Core network 206 may allow the delivery of Internet Protocol (IP) services to UEs 102 and may interface with other networks, such as data networks 208.

Data networks 208 may include networks that are external to core network 206. In some embodiments, data networks 208 may include packet data networks, such as an Internet Protocol (IP) network or another type of network. For example, data networks 208 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. In some implementations, data network 208 may provide a route through which UE 102 may connect to a particular PLMN.

For simplicity, FIG. 2 does not show all components that may be included in the network environment 200 of FIG. 2 or in networks 106 (e.g., routers, bridges, wireless access points, additional networks, Multi-Access Edge Computing (MEC) clusters, MEC networks, additional UEs 102, additional CSG access devices 104, etc.). Depending on the implementation, network environment 200 may include additional, fewer, different, or a different arrangement of components than those illustrated in FIG. 2.

Figure 3:
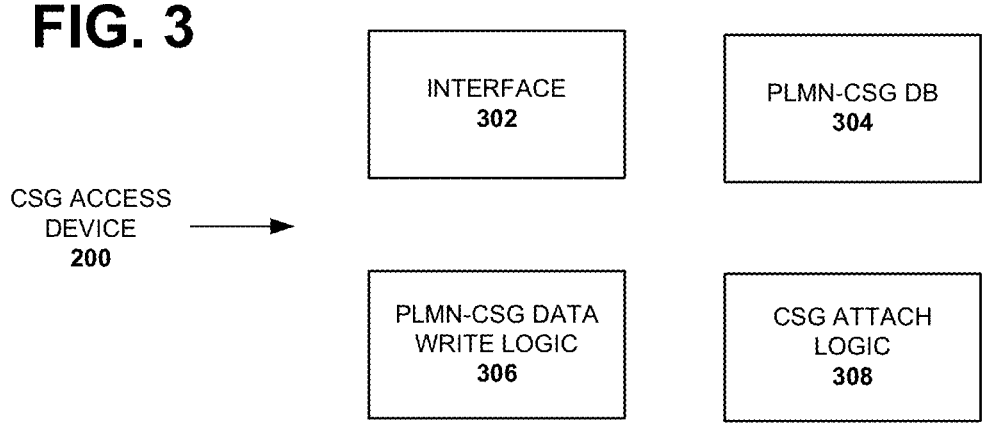
FIG. 3 illustrates exemplary functional components of a Closed Subscriber Group (CSG) access device according to an implementation.

FIG. 3 illustrates exemplary functional components of CSG access device 104 for controlling CSG access to networks, according to an implementation. As shown, CSG access device 104 may include an interface 302, PLMN-CSG database (DB) 304, PLMN-CSG data write logic 306, and CSG attach logic 308. For clarity, FIG. 3 does not show other components of CSG access device 104, such as a transmitter, demodulator, modulator, a digital-to-analog converter, a processor, etc. Depending on the implementation, for controlling CSG access to networks, CSG access device 104 may include additional, fewer, different, or a different arrangement of components than those shown in FIG. 3.

Interface 302 may include mechanisms for receiving PLMN IDs, CSG IDs, and CSG modes from network components and users (e.g., a network administrator, a customer that purchased or leased the CSG access device 104). The information received via interface 302 may be organized to indicate, for each PLMN ID, a set of CSG IDs and/or the corresponding CSG modes. That is, a CSG mode may or may not be specified for each CSG ID.

PLMN-CSG DB 304 may store the information received via interface 302. The stored information may include a list of PLMN IDs; for each PLMN ID stored, a list of CSG IDs; and for each CSG ID, optionally, a CSG mode. Depending on the implementation, the number of CSG IDs per PLMN ID may vary. For example, in one implementation, for each PLMN ID, there may be multiple CSG IDs. In a different implementation, for each PLMN ID, there may be only one unique CSG ID (e.g., unique among the CSG IDs for all of the PLMN IDs). In still yet another implementation, for each PLMN ID, there may be only one CSG ID-but each CSG ID may not necessarily be unique in the set of all CSG IDs in CSG DB 304. PLMN-CSG DB 404 304 may provide persistence, as well as a transient instance of the data for quick access by PLMN-CSG data write logic 306.

PLMN-CSG data write logic 306 may obtain PLMN IDs, the CSG IDs, and the CSG modes, and format the data. When formatting PLMN IDs, CSG IDs, and CSG modes, if PLMN-CSG data write logic 306 recognizes that the CSG mode for a particular CSG ID is the open mode, PLMN-CSG data write logic 306 may omit the CSG ID and/or the mode for the particular PLMN ID (e.g., omit the CSG ID and the CSG mode; omit the CSG mode but not the CSG ID). After the formatting, PLMN-CSG data write logic 306 may instruct other components of CSG access device 104 (e.g., components in different communication layers) to insert the formatted data in a SIB1 for transmission. The other components may then transmit the information in a particular format. Exemplary formats of the information transmitted as part of SIB1 are described below with reference to FIGS. 5A-5C.

CSG attach logic 308 may obtain CSG ID and PLMN ID in a request from UE 102 to attach to CSG access device 104 and permit UE 102 to attach to CSG access device 104 and connect to the PLMN specified by the PLMN ID. When CSG attach logic 308 receives a request to attach from UE 102, CSG attach logic 308 may forward the request (or a portion of the request) to core network 206. Core network 206 may provide CSG access device 104 with the verified CSG ID and the mode or indicate that the UE 102 does not belong to the CSG. Depending on the reply from the core network 206, CSG attach logic 308 may permit the requesting UE 102 to attach in accordance with the CSG mode.

If the request from UE 102 does not include a CSG ID, the core network may interpret the request as a request to connect to the PLMN under the open mode or the hybrid mode for a CSG (for the PLMN designated by the PLMN ID) and the CSG access device 104 may handle UE 102 in accordance with the reply. If a UE 102 is permitted to attach under the hybrid mode, the UE 102 may be preempted by another UE 102 that belongs to the CSG. That is, CSG access device 104 may enforce the preemption.

Figure 4:
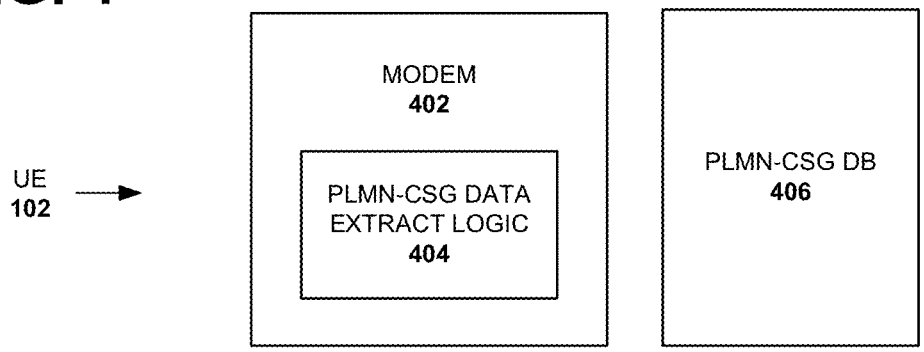
FIG. 4 depicts exemplary components of a User Equipment device (UE) according to an implementation.

FIG. 4 depicts exemplary components of UE 102 for controlling CSG access to networks according to an implementation. As shown, UE 102 may include a modem 402, which in turn may include PLMN-CSG data extract logic 404, and a PLMN-CSG DB 406. For clarity, FIG. 4 does not show other components of UE 102, such as a central processing unit (CPU), a random access memory (RAM), an operating system, applications, input components, output components (e.g., display), etc. Depending on the implementation, for controlling CSG access to networks, UE 102 may include additional, fewer, different, or a different arrangement of components than those shown in FIG. 4.

Modem 402 may handle and/or provide communication processes, such as modulation, demodulation, signal acquisition, preparing data for transmission, obtaining data from broadcast signals, scheduling data for transmission, etc. Modem 402 may include logic for obtaining information from a SIB1 broadcast from CSG access device 104. In particular, modem 402 may include PLMN-CSG data extract logic 404. Modem 402 may use the information obtained from logic 404 to perform its function, such as identifying which PLMN the host UE 102 is to connect.

PLMN CSG data extract logic 404 may obtain PLMN IDs, CSG IDs, and CSG modes within the received SIB1 and organize the information for use by modem 402. PLMN CSG data extract logic 404 may be aware of the format in which PLMN IDs, CSG IDs, and CSG modes have been embedded in the SIB1 at CSG access device 104, and therefore, use this information to extract the information from the SIB1. If there is no CSG ID specified for a PLMN ID or a CSG mode is not specified for a PLMN ID and a CSG ID, PLMN-CSG data extract logic 404 assumes that the CSG mode is the open mode.

PLMN-CSG DB 406 may store PLMN IDs and CSG IDs. PLMN-CSG DB 406 may reside within part of UE 102, such as a Subscriber Identity Module (SIM), a Universal Integrated Circuit Card (UICC), embedded UICC (eUICC), embedded SIM (eSIM), a next generation eUICC, or another SIM-like device). In some implementations, the PLMN IDs and the CSG IDs may have been provisioned to UE 102 through different applications, Within DB 406, for each PLMN ID, a set of CSG IDs and/or the corresponding CSG modes may be listed.

When modem 402 obtains PLMN IDs, CSG IDs, and/or the CSG modes from the SIB1 via logic 404, modem 402 may also retrieve obtain CSG IDs and/or PLMN IDs in PLMN-CSG DB 406. If PLMN-CSG DB 406 includes a PLMN ID and a CSG ID that match the PLMN ID and the CSG ID obtained from the SIB1, modem 402 may determine that UE 102 belongs to the CSG group with the CSG ID specified by the SIB1, and therefore, may attach through CSG access device 104 under the CSG mode (for the CSG ID) to the PLMN. Modem 402 may determine whether to attach to CSG access device 104 to connect to a particular PLMN, by determining whether the UE 102 belongs to the CSG (indicated by whether the CSG ID is found in DB 406 for the PLMN), the CSG mode, whether an application on UE 102 is requesting the connection, and/or other possible PLMNs to which UE 102 can connect.

If modem 402 obtains a PLMN ID but no CSG ID and no CSG mode, modem 402 may nonetheless attempt to attach to the PLMN specified by the PLMN ID under the open mode. In this case, modem 402 does not need to provide the CSG ID in the attachment request to CSG access device 104, although a PLMN ID is needed to identify the PLMN.

As indicated above, CSG access device 104 may be implemented to broadcast PLMN IDs, CSG IDs, and CSG modes in SIB1. CSG access device 104 may send the information in a SIB1 in accordance with a particular format. FIGS. 5A-5C illustrate exemplary formats of a SIB1 that includes PLMN IDs, CSG IDs, and CSG modes, according to different implementations.

FIG. 5A shows an exemplary format in which PLMN IDs, CSG IDs, and CSG modes are included in SIB1 500 according to an implementation. As shown, SIB1 500 may include a CSG-INFO-PER-PLMN-LIST 502, which is a sequence of CSG-INFO-PER-PLMN 504. As also shown, CSG-INFO-PER-PLMN 504 includes a PLMN ID and a CSG-INFO-LIST, which is a sequence of CSG-INFO 506. CSG-INFO 506 includes a CSG ID and a CSG mode.

FIG. 5B shows another exemplary format in which PLMN IDs, CSG IDs, and CSG modes may be included in SIB1 510, according to an implementation. As shown, SIB1 510 may include a PLMNS-PER-CSG-LIST 512, which is a sequence of PLMNS-PER-CSG 514. As also shown, PLMN-PER-CSG 514 includes a CSG-INFO and a PLMN-IDENTTIYLIST. As in FIG. 5A, CSG-INFO 516 includes a CSG ID and a CSG mode. PLMN-IDENTITYLIST includes a sequence of PLMN-IDENTITYINFO.

FIG. 5C shows yet another exemplary format in which PLMN IDs, CSG IDs, and CSG modes are included in SIB1 520, according to an implementation. As shown, SIB1 520 may include a PLMN-IDENTITYLIST 522, which is a sequence of PLMN-IDENTITYINFO 524. In this PLMN-IDENTITYINFO 524 is different from a standard PLMN-IDENTITYINFO. In this implementation, PLMN-IDENTITYINFO 524 is a modified version, of a standard PLMN-IDENTITYINFO, which includes a CSG-INFOLIST 526. CSG-INFOLIST 526 is a sequence of CSG-INFO 528. As in FIGS. 5A and 5B, CSG-INFO includes a CSG ID and a CSG mode.

Figure 6:
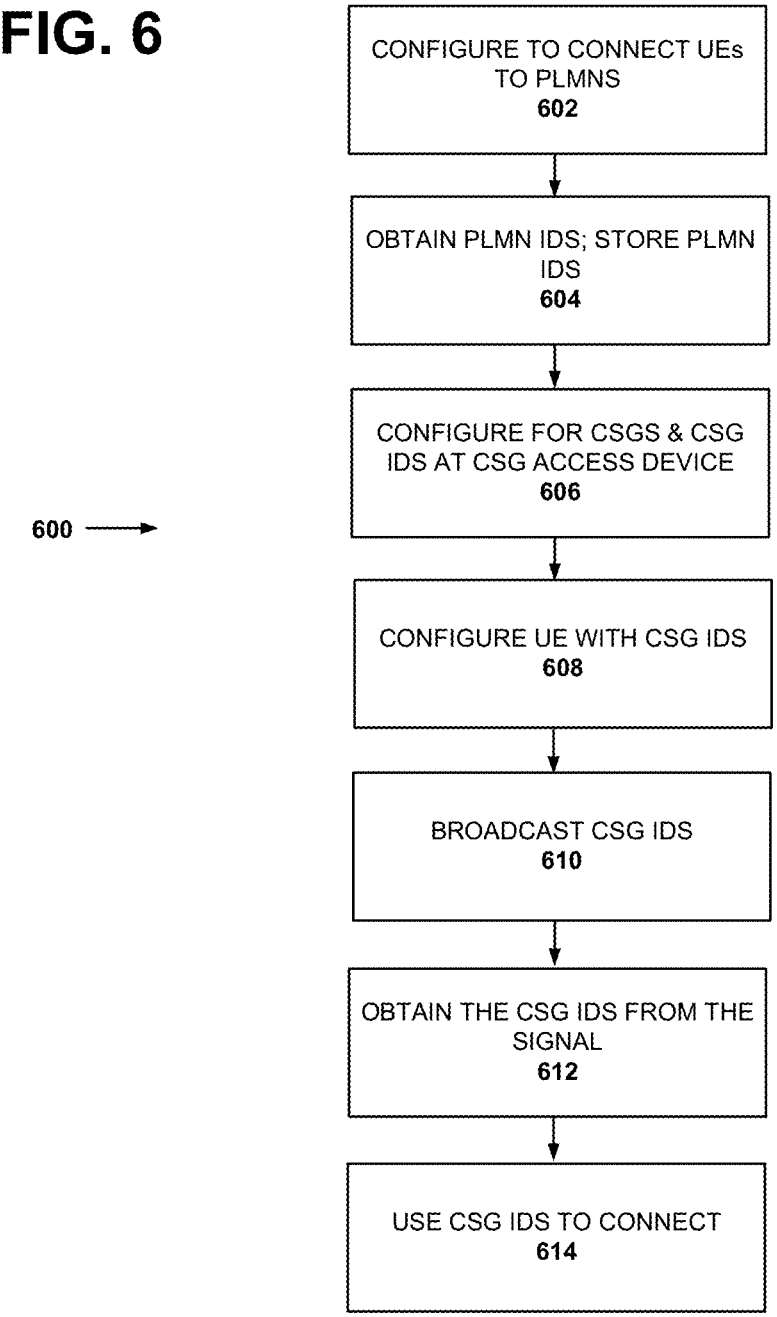
FIG. 6 is a flow diagram of an exemplary process that is associated with controlling CSG access to networks.

FIG. 6 shows a flow diagram of an exemplary process 600 that is associated with controlling CSG access to network, according to an implementation. Process 600 may be performed by components in UE 102, CSG access device 104, and/or another network component or device. As shown, process 600 may include CSG access device 104 being configured to have UEs 102 that attach to CSG access device 104 to be able to connect to particular PLMNs through CSG access device 104 (block 602). The configuring may include, for example, connecting CSG access device 104, through a Digital Subscriber Line (DSL), an optical cable, a wireless connection, etc., to a network (e.g., access network 204).

CSG access device 104 may obtain PLMN IDs for PLMNs to which CSG access device 104 may permit attached UEs 102 to connect (block 604). CSG access device 104 may obtain the PLMN IDs from the PLMNs to which CSG access device 104 is connected or from an administrator. Furthermore, CSG access device 104 may store the PLMN IDs corresponding to the PLMNs (block 604). CSG access device 104 may or may not obtain the PLMN IDs at the same time it is configured with the PLMNs.

Process 600 may further include configuring CSG access device 104 with CSG IDs (block 606). For one or more of the PLMN IDs stored at CSG access device 104, CSG access device 104 may be provisioned with one or more CSG IDs that correspond to CSGs, along with the corresponding CSG modes for the CSG IDs. The provisioning may be performed by an operator, through an administration program, or by a network component that has the CSG information for the PLMN. After the configuration, CSG access device 104 may store the configuration (e.g., the CSG information) for each of the PLMNs.

UE 102 may be configured with CSG IDs (block 608). For the closed mode, the provisioned CSG IDs (for a particular PLMN ID) are also stored at the PLMN-CSG DB 304 on CSG access device 104.

Depending on the implementation, the configuration may be performed in various ways. For example, according to one implementation, UE 102 may include an application that permits the user to enter CSG IDs, for a particular PLMN ID. In a different implementation, an application on UE 102 may have UE 102 attach to CSG access device 104 and present to the user, CSG IDs that may be available to be provisioned (e.g., CSG IDs that are in PLMN-CSG DB 304 (for each PLMN to which the UE 102 may connect. When the user selects or enters the CSG IDs or the application automatically selects all available CGS IDs, UE 102 may store the CSG IDs (for the particular PLMN) in its PLMN-CSG DB 404. In yet another example, UE 102 may be provisioned with a CSG ID from a PLMN during UE subscription. The network may store the CSG ID in the subscription profile for the UE 102 and/or the user of UE 102.

Process 600 may further include broadcasting, by CSG access device 104, CSG IDs in SIB1 (block 610). For example, CSG access device 104 may format CSG information obtained from its PLMN-CSG DB 304 and broadcast the information in a SIB1 in accordance with one of the formats illustrated in FIGS. 5A-5C or in accordance with another format. The SIB1 may or may not include a CSG ID, depending on whether the mode is the open mode, the hybrid mode, or the closed mode. For example, for the hybrid mode or the open mode, the SIB1 may not include the CSG ID and/or the CSG mode.

When UE 102 is in the range of a broadcast signal from CSG access device 104, UE 102 may acquire the signal and obtain the system information from the SIB1 in the signal. In particular, UE 102 may obtain the CSG IDs, the CSG modes, and the associated PLMN IDs from the SIB1 (block 612). UE 102 may be aware of the format of the CSG information and thus able to parse the CSG information— CSG IDs, the corresponding CSG modes, and the PLMN IDs. After UE 102 obtains the CSG information from the signal, UE 102 may look up, in its own memory, CSG IDs for the PLMNs to which UE 102 may connect. Depending on whether the UE 102 is a member of the CSGs (i.e., UE 102 has the CSG IDs in its PLMN-CSG DB 406, UE 102 may proceed to select the PLMN among the PLMNs to which UE 102 may connect via CSG access device 104 (block 614). If UE 102 is not a member of a CSG for connecting to a particular PLMN, UE 102 may determine whether UE 102 is a member of other CSGs for other PLMNs to which UE 102 may connect. If UE 102 determines that the alternative connection is preferable, UE 102 may attempt to attach to CSG access device 102 using the selected CSG ID and connect to the alternative PLMN. This may allow users to prioritize access to various networks, such as private networks to which they have access.

If UE 102 detects a PLMN ID without a CSG ID and/or the mode, UE 102 may nonetheless attempt to attach to CSG access device 104 to connect to the PLMN, under the open mode or the hybrid mode. In this case, UE 102 may not include a CSG ID in sending the request to attach to the CSG access device 104.

When CSG access device 104 receives the request to attach to a PLMN from UE 102, CSG access device 104 may forward the request to a component in core network 206 to verify or validate the CSG ID (if specified) and the mode (which is the open mode or the hybrid mode if the CSG ID is not specified in the request). If the core component validates the CSG ID and the mode, CSG access device 104 may permit the UE 102 to attach, access its resources, and/or connect to the PLMN. If the UE 102 attaches to CSG access device 104 under the hybrid mode, CSG access device 104 may enforce its preemption rule pertaining to preferred UEs 102. If the core network component indicates that the UE 102 does not belong to the CSG and/or the CSG is not in the open or hybrid mode, CSG access device 104 may deny UE 102 from attaching to CSG access device 104, connecting to the PLMN, and/or using its resources.

Figure 7:
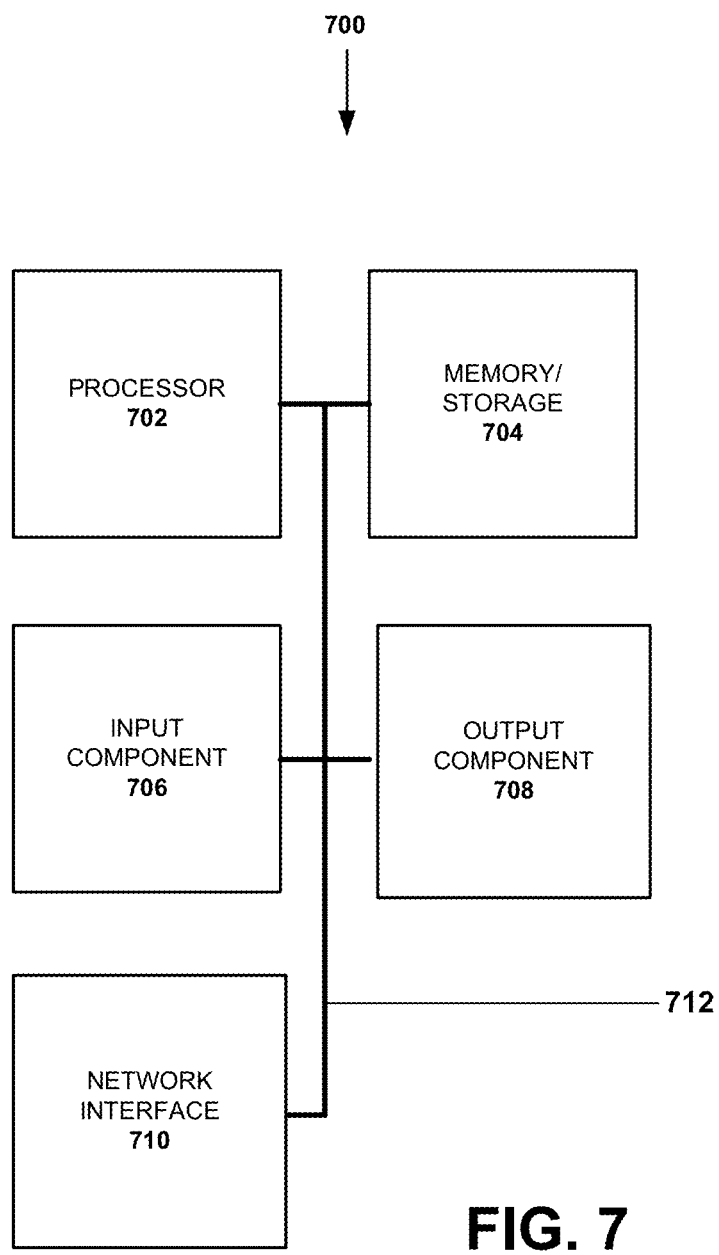
FIG. 7 illustrates exemplary components of a network device.

FIG. 7 depicts exemplary components of an exemplary network device 700. Network device 700 corresponds to or is included in UE 102, CSG access device 104, routers, switches, and/or any of the network components of FIGS. 1A, 1B 2, and 3 (e.g., servers, gateways, etc.). As shown, network device 700 includes a processor 702, memory/storage 704, input component 706, output component 708, network interface 710, and communication path 712. In different implementations, network device 700 may include additional, fewer, different, or a different arrangement of components than the ones illustrated in FIG. 7.

Processor 702 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 700 and/or executing programs/instructions.

Memory/storage 704 may include static memory, such as read only memory (ROM), and/or dynamic memory, such as random access memory (RAM), or onboard cache, for storing data and machine-readable instructions (e.g., programs, scripts, etc.).

Memory/storage 704 may also include a compact disc (CD) ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 704 may be external to and/or removable from network device 700. Memory/storage 704 may include, for example, a Universal Serial Bus (USB) memory stick, a dongle, a hard disk, off-line storage, a Blu-Ray® disk (BD), etc. Memory/storage 704 may also include devices that can function both as a RAM-like component or persistent storage. Depending on the context, the term "memory," "storage," "storage device," "storage unit," and/or "medium" may be used interchangeably. For example, a "computer-readable storage device" or "computer-readable medium" may refer to both a memory and/or storage device.

Input component 706 and output component 708 may provide input and output from/to a user to/from network device 700. Input and output components 706 and 708 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 700.

Network interface 710 may include a transceiver (e.g., a transmitter and a receiver) for network device 700 to communicate with other devices and/or systems. For example, via network interface 710, network device 700 may communicate with a wireless station. Network interface 710 may include an Ethernet interface to a LAN, and/or an interface/connection for connecting network device 700 to other devices (e.g., a Bluetooth interface). For example, network interface 710 may include a wireless modem for modulation and demodulation.

Communication path 712 may enable components of network device 700 to communicate with one another.

Network device 700 may perform the operations described herein in response to processor 702 executing software instructions stored in a non-transient computer-readable medium, such as memory/storage 704. The software instructions may be read into memory/storage 704 from another computer-readable medium or from another device via network interface 710. The software instructions stored in memory or storage (e.g., memory/storage 704, when executed by processor 702, may cause processor 702 to perform processes that are described herein.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and have been described above with regard to the processes, messages, and signals illustrated in FIG. 6, the order of the blocks, messages, and signals may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
   a processor configured to:
   receive a first Public Land Mobile Network (PLMN) identifier (ID) that identifies a first PLMN;
   receive first Closed Subscriber Group (CSG) information that is associated with the first PLMN ID;
   store the first CSG information and second information which indicates that the first CSG information is associated with the first PLMN ID, wherein the second information includes two or more data items, wherein each of the data items comprises:
   a CSG information item that includes a CSG ID and a CSG mode; and
   a list of PLMN IDs; and
   broadcast the first CSG information and the second information to a User Equipment device (UE).

2. The device of claim 1, wherein the device comprises a small cell.

3. The device of claim 1, wherein when the processor broadcasts the first CSG information and the second information, the processor is configured to:
   insert the second information in a system information block (SIB); and
   transmit the SIB to the UE.

4. The device of claim 1, wherein the first CSG information includes:
   a CSG mode.

5. The device of claim 4, wherein the CSG mode includes one of:
   a closed mode; or
   a hybrid mode.

6. The device of claim 1, wherein the processor is further configured to:
   receive third CSG information associated with the first PLMN ID, wherein the third CSG information includes a CSG ID which is different from a CSG ID included in the first CSG information.

7. The device of claim 1, wherein the UE includes a CSG ID, associated with a second PLMN ID, in storage.

8. The device of claim 7, wherein the storage includes a Subscriber Information Module (SIM), a Universal Integrated Circuit Card (UICC), an embedded SIM, or an embedded UICC.

9. The device of claim 7, wherein the UE is configured to:
   receive the first CSG information and the second information broadcast from the device;
   retrieve the CSG ID from the storage;
   when the retrieved CSG ID matches a CSG ID in the received first CSG information, send a request to the device for an attachment.

10. The device of claim 1, wherein the processor is further configured to:
    receive a request from a second UE to connect to a second PLMN whose PLMN ID is different from the first PLMN ID, wherein the request does not include a CSG ID, and
    permit the second UE to wirelessly attach to the device under an open mode for a second CSG ID associated with the second PLMN.

11. A method comprising:
    receiving a first Public Land Mobile Network (PLMN) identifier (ID) that identifies a first PLMN;
    receiving first Closed Subscriber Group (CSG) information that is associated with the first PLMN ID;
    storing the first CSG information and second information which indicates that the first CSG information is associated with the first PLMN ID, wherein the second information includes two or more data items, wherein each of the data items comprises:
    a CSG information item that includes a CSG ID and a CSG mode; and
    a list of PLMN IDs; and
    broadcasting the first CSG information and the second information to a User Equipment device (UE).

12. The method of claim 11, wherein receiving the first PLMN ID includes:
    receiving, by a femtocell, the first PLMN ID that identifies the first PLMN.

13. The method of claim 11, wherein broadcasting the first CSG information and the second information includes:
    inserting the second information in a system information block (SIB); and
    broadcasting the SIB to the UE.

14. The method of claim 11, wherein the first CSG information includes:
    a CSG mode.

15. The method of claim 14, wherein the CSG mode includes one of:
    a closed mode; or
    a hybrid mode.

16. The method of claim 11, further comprising:
    receiving second CSG information associated with the first PLMN ID, wherein the second CSG information includes a CSG ID which is different from a CSG ID included in the first CSG information.

17. The method of claim 11, wherein the UE includes a CSG ID, associated with a second PLMN ID, in storage.

18. The method of claim 17, wherein the UE is further configured to:
    receive the first CSG information and the second information broadcast from a femtocell;
    retrieve the CSG ID from the storage; and
    when the retrieved CSG ID matches a CSG ID in the received first CSG information, send a request to the femtocell for an attachment.

19. The method of claim 11, further comprising:
    receiving, at a femtocell, a request from a second UE to connect to a second PLMN whose PLMN ID is different from the first PLMN ID and the request does not include a CSG ID, and
    permitting the second UE to wirelessly attach to the femtocell under an open mode for a second CSG ID associated with the second PLMN.

20. A non-transitory computer-readable medium comprising processor-executable instructions, when executed by a processor in a device, cause the processor to:
    receive a first Public Land Mobile Network (PLMN) identifier (ID) that identifies a first PLMN;
    receive first Closed Subscriber Group (CSG) information that is associated with the first PLMN ID;
    store the first CSG information and second information which indicates that the first CSG information is associated with the first PLMN ID, wherein the second information includes two or more data items, wherein each of the data items comprises:

a CSG information item that includes a CSG ID and a
   CSG mode; and
a list of PLMN IDs; and
broadcast the first CSG information and the second information to a User Equipment device (UE).

* * * * *